United States Patent [19]

Eguchi

[11] Patent Number: 4,636,873
[45] Date of Patent: Jan. 13, 1987

[54] METHOD AND APPARATUS FOR RECORDING AND REPRODUCING AN INFORMATION SIGNAL WITH A LARGER TAPE WRAPPING ANGLE

[75] Inventor: Takeo Eguchi, Kanagawa, Japan

[73] Assignee: Sony Corporation, Tokyo, Japan

[21] Appl. No.: 798,711

[22] Filed: Nov. 15, 1985

Related U.S. Application Data

[63] Continuation of Ser. No. 486,812, Apr. 20, 1983, abandoned.

[30] Foreign Application Priority Data

Apr. 23, 1982 [JP] Japan ................................ 57-69426

[51] Int. Cl.⁴ .......................... G11B 5/00; G11B 5/02; G11B 15/14
[52] U.S. Cl. .......................................... 360/8; 360/21; 360/64
[58] Field of Search .................... 360/8, 21, 22, 32, 33, 360/64, 9.1

[56] References Cited

U.S. PATENT DOCUMENTS

| | | | |
|---|---|---|---|
| 2,712,572 | 7/1955 | Roberts | 360/21 |
| 3,860,760 | 1/1975 | Rittenbach | 360/8 |
| 4,007,482 | 11/1975 | Amari | 358/4 |
| 4,007,484 | 12/1975 | Amari | 358/8 |
| 4,197,562 | 4/1980 | Kikuya et al. | 360/10.3 |
| 4,321,634 | 3/1982 | Lehureau | 360/21 |
| 4,424,541 | 1/1984 | Koinuma et al. | 360/21 |
| 4,458,272 | 7/1984 | Heitmann | 360/8 |
| 4,484,236 | 11/1984 | Wilkinson | 360/64 |
| 4,549,227 | 10/1985 | Hashimoto et al. | 360/32.2 |

Primary Examiner—Vincent P. Canney
Attorney, Agent, or Firm—Lewis H. Eslinger; Alvin Sinderbrand

[57] ABSTRACT

Apparatus for recording and reproducing digital color video signals from successive, parallel tracks on a magnetic tape includes a rotary guide drum about which the magnetic tape is wrapped for an angle greater than a nominal angle of 180° for real time recording and reproduction; a recording section including time base expander circuits for expanding the time base of the digital color video signals, and two diametrically opposite pairs of recording rotary magnetic heads, with the recording rotary magnetic heads of each pair having magnetic gaps with different azimuth angles for recording the time base expanded video signals in the parallel tracks; and a reproducing section including two diametrically opposite pairs of reproducing rotary magnetic heads, with the reproducing rotary magnetic heads of each pair having magnetic gaps with different azimuth angles, for reproducing the time base expanded video signals from the parallel tracks, and time base compression circuits for compressing the time base of the time base expanded video signals to return the same to its original time base, thereby providing a lower Nyquist frequency, while also providing a high signal-to-noise ratio with a sufficiently wide frequency range, and without increasing the diameter of the guide drum.

14 Claims, 8 Drawing Figures

FIG. 1
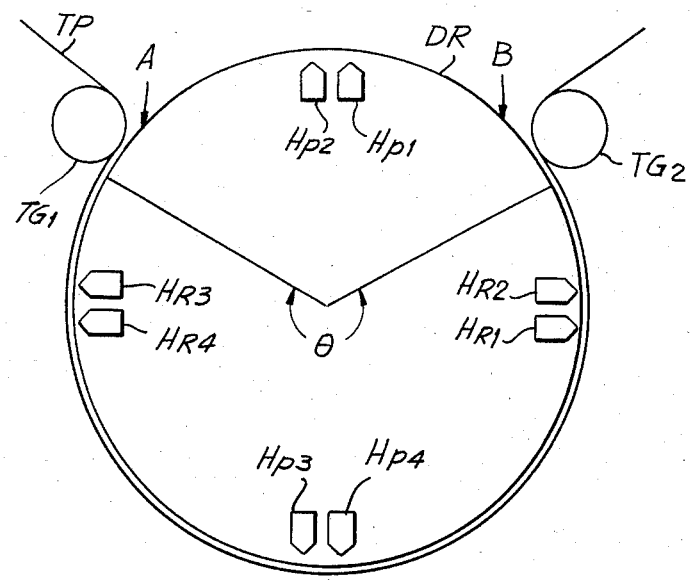
FIG. 2
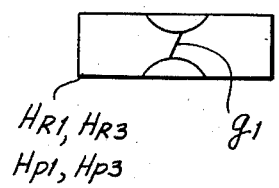
FIG. 3
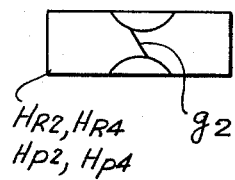
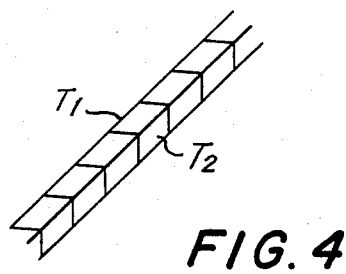
FIG. 4

METHOD AND APPARATUS FOR RECORDING AND REPRODUCING AN INFORMATION SIGNAL WITH A LARGER TAPE WRAPPING ANGLE

This is a continuation of application Ser. No. 486,812, filed Apr. 20, 1983, now abandoned.

BACKGROUND OF THE INVENTION

This invention relates generally to apparatus for recording and reproducing information signals and, more particularly, is related to apparatus for recording and reproducing digital video signals in a plurality of record tracks extending obliquely on a magnetic tape.

Generally, a video tape recorder (VTR) includes at least one rotary magnetic head which records and/or reproduces video signals from a magnetic tape, with the magnetic head or heads being mounted on a rotary portion of a tape guide drum about which the tape is at least partially wrapped. However, various restrictions must be taken into consideration when constructing a VTR, for example, the number of magnetic heads, the tape wrapping angle about the guide drum, and the like. For example, where one rotary magnetic head is provided for recording and reproducing a video signal with respect to the magnetic tape, the timing of the video signal which is recorded and reproduced can not be freely varied because of the restrictions of a one head arrangement. Thus, with a VTR having a single rotary magnetic head, if synchronizing signals are not recorded on the magnetic tape, synchronizing signals must be added to the video signal during reproduction in the interval during which the rotary magnetic head does not contact the magnetic tape so as to compensate for the synchronizing signals that were not recorded. As a result, a constant restriction in the timing of the signal recorded by the rotary magnetic head exists in the interval during which the rotary magnetic head contacts the magnetic tape so that the wrapping angle of the magnetic tape on the tape guide drum can not be freely varied.

On the other hand, with a VTR having two rotary magnetic heads positioned 180° apart, that is, diametrically opposite to each other, the wrapping angle of the magnetic tape around the tape guide drum is 180°, thereby reducing the wrapping angle in comparison with that for a one head arrangement and providing the advantage that loading of the magnetic tape around the guide drum is easier. In such case, a tape cassette containing the magnetic tape can be readily used with the VTR. It is to be appreciated that, with the two head arrangement, the two rotary magnetic heads are selectively switched ON and OFF, or changed over, every 180° so that the information signals recorded on and reproduced from the magnetic tape are continuous in time. Except for the fact that a margin is provided at both edges of the magnetic tape so as to avoid adverse affects when each rotary magnetic head first contacts and terminates its contact with the magnetic tape, there are no direct advantages in increasing the wrapping angle of the magnetic tape around the tape guide drum. Accordingly, the wrapping angle of the magnetic tape is selected to be approximately 180°.

On the other hand, in a VTR equipped with two or more pairs of rotary magnetic heads, the timing of the information signal recorded on the magnetic tape can be freely varied so that it is unnecessary to specify a specific wrapping angle, for example, 360° (340°), 180° and 90° for two or more pairs of rotary magnetic heads. In such case, however, an optimum wrapping angle should be chosen which optimally satisfies various conditions. Thus, the wrapping angle should be chosen taking into consideration the following conditions:

(1) The number of rotary magnetic heads and the number of channels with respect to the rotary transformer must be as few as possible.
(2) The friction generated when the magnetic tape is wrapped around the tape guide drum must be sufficiently small and non-uniformity in contact of each rotary magnetic head with the magnetic tape, caused by, for example, sticking of the tape to the tape guide drum, non-uniformity or scattering in the air layer, and the like, must be minimized.
(3) The magnetic tape must be easily loaded around the tape guide drum with the magnetic tape being conveniently contained in a tape cassette.
(4) A large amount of information in a narrow frequency band must be capable of being processed between the rotary magnetic heads and the rotary transformer.

In regard to condition (1), the fewest number of rotary magnetic heads is, of course, one. However, as previously discussed in regard to the one head arrangement, the timing of the information signals recorded on the magnetic tape is severely restricted, and the variety of signals that can be processed are also considerably restricted. In other words, a single rotary magnetic head system is not suitable for recording video information in digital form. Further, in accordance with present sampling standards for digital video signals, when the sampling frequencies are 13.5 MHz for the luminance signal and 6.75 MHz for the two color difference signals, 8 bits per sample are selected. In such case, the bit rate for the digital video signal, including the blanking period, is 216 Mbits/sec, thereby requiring at least a 4-head and 2-channel system. In such system, two pairs of rotary magnetic heads are positioned apart with an angular spacing of 180° and with each pair of rotary magnetic heads being formed of two adjacent rotary magnetic heads having magnetic gaps with different azimuth angles. It is to be appreciated that, in such case, it is possible that the recording and playback rotary magnetic heads are separately provided, or alternatively, that the rotary magnetic heads serve both for recording and playback.

In this regard, the 4-head and 2-channel system can be satisfactorily used for the high 216 Mbits/sec rate, while also providing a tape wrapping angle of 180°, thereby enabling easy loading of the magnetic tape around the tape guide drum. Thus, except for the 4-head and 2-channel system, other systems do not meet the aforementioned conditions (1) and (4). The following Table compares the 4-head and 2-channel system with other systems as to the tape wrapping angle and Nyquist frequency.

TABLE

| Number of Heads | Number of Channels | Tape Wrapping Angle | Nyquist Frequency |
| --- | --- | --- | --- |
| 1 | 1 | 360° | 108 MHz |
| 2 | 1 | 180° | 108 MHz |
| 2 | 2 | 360° | 54 MHz |
| 3 | 1 | 120° | 108 MHz |
| 3 | 3 | 360° | 36 MHz |
| 4 | 1 | 90° | 108 MHz |
| 4 | 2 | 180° | 54 MHz |

| | TABLE-continued | | |
|---|---|---|---|
| Number of Heads | Number of Channels | Tape Wrapping Angle | Nyquist Frequency |
| 4 | 4 | 360° | 27 MHz |

However, as shown in the above Table, the 4-head and 2-channel system requires a significantly high Nyquist or minimun sampling frequency of 54 MHz. Considering the frequency characteristics of the rotary magnetic heads, the rotary transformer and the recording and reproducing amplifiers, it is thereby quite difficult to put the 4-head and 2-channel system into practice. In view of these problems, it is desirable to provide a VTR operable with a lower Nyquist frequency, yet capable of providing a high signal-to-noise (S/N) ratio with a sufficiently wide frequency range, while also not increasing the diameter of the tape guide drum.

OBJECTS AND SUMMARY OF THE INVENTION

Accordingly, it is an object of this invention to provide a method and apparatus for recording and/or reproducing information signals that avoids the above-described difficulties encountered with the aforementioned arrangements.

More particularly, it is an object of this invention to provide a method and apparatus for recording and/or reproducing digital video signals with a low Nyquist frequency.

It is another object of this invention to provide a method and apparatus for recording and/or reproducing information signals with a high S/N ratio without increasing the size of the tape guide drum.

It is still another object of the invention to provide a method and apparatus for recording and/or reproducing information signals with a high S/N ratio and with a sufficiently wide frequency range.

In accordance with an aspect of this invention, apparatus for recording and reproducing original information signals in a plurality of tracks on a record medium, includes a recording section having time base expansion means for expanding the time base of the information signals to produce time base expanded information signals, and a plurality of magnetic heads for recording the time base expanded information signals on the record medium; and a reproducing section having a plurality of magnetic heads for reproducing the time base expanded information signals from the record medium, and time base compression means for time base compressing the time base of the time base expanded information signals to produce the original information signals.

The above, and other, objects, features and advantages of the present invention will become apparent from the following detailed description thereof which is to be read in connection with the accompanying drawings.

BRIEF DESCRIPTION OF THE DRAWINGS

FIG. 1 is a schematic diagram of a rotary magnetic head assembly in accordance with one embodiment of the present invention;

FIG. 2 is a schematic diagram showing the magnetic gaps of some of the rotary magnetic heads of FIG. 1;

FIG. 3 is a schematic diagram showing the magnetic gaps of the remaining rotary magnetic heads of FIG. 1;

FIG. 4 is a schematic diagram showing the arrangement of record tracks formed by each pair of recording rotary magnetic heads according to the present invention;

DETAILED DESCRIPTION OF A PREFERRED EMBODIMENT

Figure 5:
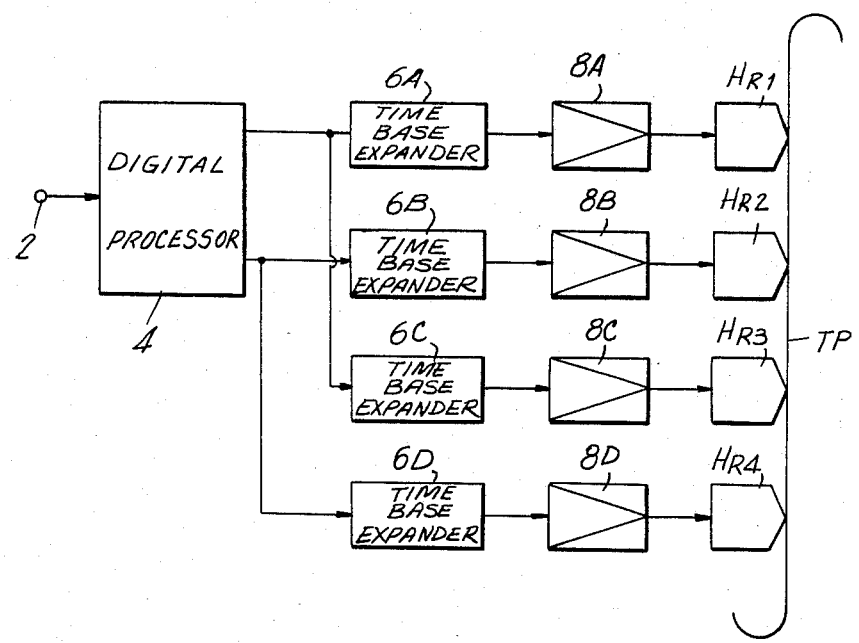
FIG. 5 is a block diagram of a recording section of a VTR according to one embodiment of the present invention.

Referring to the drawings in detail, and initially to FIG. 1 thereof, a rotary magnetic head assembly for recording and reproducing information signals, preferably digital video signals, according to this invention includes a tape guide drum DR which may be comprised of an upper rotary drum and a lower fixed or stationary drum, or alternatively, upper and lower fixed or stationary drums and a middle rotary drum. A magnetic tape TP is wrapped about the outer periphery of guide drum DR so as to subtend an angle of $\theta$. Magnetic tape TP is advanced at a constant speed about tape guide drum DR by a tape drive system (not shown) comprising a capstan and pinch roller and is guided about tape guide drum DR by tape guide pins or rollers $TG_1$ and $TG_2$ which determine the tape wrapping angle $\theta$.

Secured to the rotary guide drum of tape guide drum DR are recording rotary magnetic heads $H_{R1}$–$H_{R4}$ and reproducing rotary magnetic heads $H_{P1}$–$H_{P4}$. More particularly, the recording rotary magnetic heads are arranged in pairs $H_{R1}$, $H_{R2}$ and $H_{R3}$, $H_{R4}$, each pair being positioned diametrically opposite the other pair, that is, 180° apart thereform. In like manner, the reproducing rotary magnetic heads are formed in two pairs $H_{P1}$, $H_{P2}$ and $H_{P3}$, $H_{P4}$, with the two pairs of reproducing rotary magnetic heads being positioned diametrically opposite to each other, that is, 180° apart, and with each pair of reproducing rotary magnetic heads being separated from each adjacent pair of recording rotary magnetic heads by an angular spacing of 90°.

The recording and reproducing rotary magnetic heads are constructed so that recording rotary magnetic heads $H_{R1}$ and $H_{R3}$ and reproducing rotary magnetic heads $H_{P1}$ and $H_{P3}$ have a magnetic gap $g_1$ with the same azimuth angle, as shown in FIG. 2, while the remaining recording rotary magnetic heads $H_{R2}$ and $H_{R4}$ and the remaining reproducing rotary magnetic heads $H_{P2}$ and $H_{P4}$ have a magnetic gap $g_2$ with a second azimuth angle which is identical in value but opposite to the first azimuth angle, as shown in FIG. 3. It is therefore to be appreciated that the rotary magnetic heads of each pair have magnetic gaps $g_1$ and $g_2$ with opposite azimuth angles. In this manner, each pair of rotary magnetic heads $H_{R1}$, $H_{R2}$ and $H_{R3}$, $H_{R4}$ are adapted to record information signals in adjacent parallel record tracks $T_1$ and $T_2$, respectively, extending obliquely on magnetic tape TP, with opposite azimuth angles, as shown in FIG. 4. During reproduction, the information signals in tracks $T_1$ and $T_2$ are reproduced by, for example, pairs of reproducing rotary magnetic heads $H_{P1}$, $H_{P2}$ and $H_{P3}$, $H_{P4}$, respectively.

As previously discussed, a 4-head and 2-channel arrangement requires a high Nyquist frequency. It is therefore desirable to reduce the Nyquist frequency, and thereby narrow the allowable frequency band of the signals to be recorded, to reduce the cost and complexity of the magnetic heads, rotary transformer and processing circuitry. It is to be appreciated that, with the above arrangement, the wrapping angle $\theta$ necessary for real time recording and reproduction of information signals is 180°, as shown in the above Table. However, the frequency characteristic, that is, the allowable frequency band of the signals, through the rotary magnetic heads, the rotary transformer and the like is narrowed in reverse proportion to the wrapping angle $\theta$. Thus, in accordance with the present invention, the tape wrapping angle $\theta$ is increased without increasing the size of the tape guide drum, thereby reducing the required Nyquist frequency and narrowing the frequency band of the signals that are recorded. However, it is to be appreciated that, in accordance with the present invention, the frequency band of the signals are sufficiently wide for good recording and reproduction.

However, there are certain limitations as to how much the wrapping angle $\theta$ can be increased. From the point of view of friction of magnetic tape TP against tape guide drum DR and the loading mechanism for loading magnetic tape TP around tape guide drum DR when magnetic tape TP is contained within a tape cassette, it becomes impractical to select the tape wrapping angle $\theta$ equal to 360°. Further, if tape guide drum DR comprises upper and lower stationary drums and a middle rotary drum, the support structure for the upper and lower stationary drums occupies an angular spacing of at least 90°, as shown at points A and B in FIG. 1. Taking the above limitations into consideration, the tape wrapping angle $\theta$ of magnetic tape TP around tape guide drum DR is made less than 270°. Practically speaking, however, further taking into consideration the positioning of tape guide pins $TG_1$ and $TG_2$, a maximum wrapping angle $\theta$ is equal to approximately 240°. In such case, the Nyquist frequency $f_N$ that is required is calculated as follows:

$$f_N = 54 \times 180/240 = 40.5 \text{ MHz} \quad (1).$$

It is to be appreciated that, with the wrapping angle increased to 240°, the Nyquist frequency is 25% less than that for the case where the wrapping angle is selected as 180°. Preferably, the tape wrapping angle $\theta$ is selected to be greater than 180° and less than 240°. For example, when the tape wrapping angle is selected as 220°, the Nyquist frequency $f_N$ is 44.2 MHz. In such case, the diameter of tape guide drum DR may be, for example, 110 mm. It is to be noted that, if tape guide drum DR comprises an upper rotary guide drum and a lower stationary drum, the tape wrapping angle can more freely be selected in comparison to the case where tape guide drum DR comprises upper and lower stationary drums and a middle rotary drum.

It is to be appreciated that, since the tape wrapping angle $\theta$ is increased from the nominal real time tape wrapping angle of 180°, while maintaining the size of the tape guide drum, the rotary magnetic heads are in contact with magnetic tape for a longer length thereof. Thus, the information signals must be time base expanded. In this regard, and referring to FIGS. 5 and 6, the information signals are time base expanded prior to recording the same in the record tracks, in accordance with the present invention. As shown in FIG. 5, an analog information signal, such as an analog color video signal, is supplied through an input terminal 2 to a recording digital processing circuit 4 which converts the analog video signal to a digital video signal and channel encodes the digital video signal so as to separate the digital video signal into two channels. The digital video signal in one channel is supplied to time base expansion circuits 6A and 6C, while the digital video signal in the other channel is supplied to time base expansion circuits 6B and 6D, the time base expansion circuits functioning to expand the time base of the digital video signals supplied thereto. The time base expanded signals from the time base expansion circuits 6A–6D are supplied through recording amplifiers 8A–8D to recording rotary magnetic heads $H_{R1}$–$H_{R4}$, respectivey, which record the digitized video signals in successive, parallel record tracks extending obliquely on magnetic tape TP.

Figure 6:
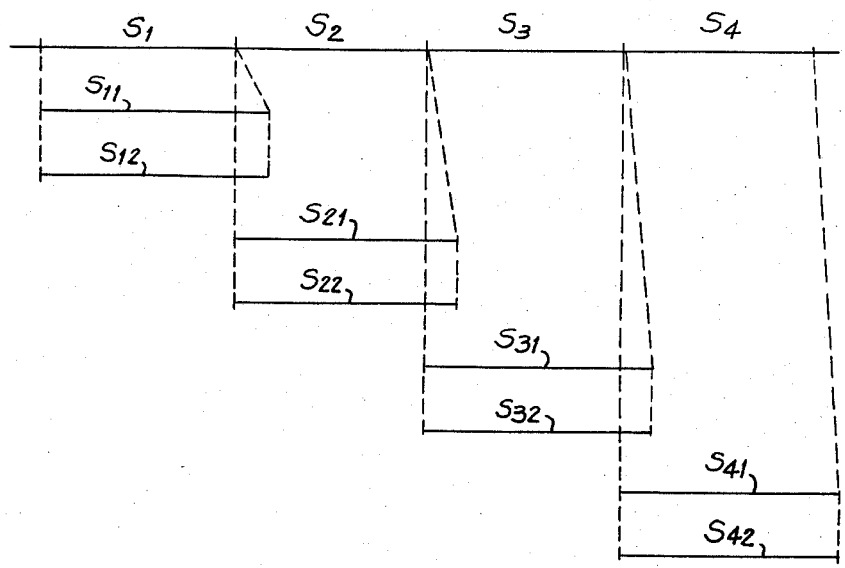
FIG. 6 is a timing chart used for explaining the operation of the recording section of FIG. 5.

In operation, for every field or one-half field interval, the analog video signal from input terminal 2 is divided by recording digital processing circuit 4 into analog video signals $S_1, S_2, S_3, S_4, \ldots$ and converted into digital form. The digitized signals $S_1, S_2, S_3, S_4 \ldots$ are then each further divided into two channel digital video signals and supplied to the two channels, respectively. For example, digital video signal $S_1$ is separated into digital video signals $S_{11}$ and $S_{12}$, which are supplied to time base expansion circuits 6A and 6B, respectively, where the signals have their time base expanded, as shown in FIG. 6. The time base expanded signals $S_{11}$ and $S_{12}$ from time base expansion circuits 6A and 6B, respectively, are supplied through recording amplifiers 8A and 8B to recording rotary magnetic heads $H_{R1}$ and $H_{R2}$ which record the expanded signals $S_{11}$ and $S_{12}$ in adjacent parallel tracks extending obliquely on magnetic tape TP, for example, as shown in FIG. 4. The subsequent digital video signal $S_2$ is then separated into two channel digital video signals $S_{21}$ and $S_{22}$ which are supplied to time base expansion circuits 6C and 6D, respectively, which expand the time base of such signals, as shown in FIG. 6. Time base expanded signals $S_{21}$ and $S_{22}$ are then supplied through recording amplifiers 8C and 8D to recording rotary magnetic heads $H_{R3}$ and $H_{R4}$, respectively, which record signals $S_{21}$ and $S_{22}$ in the next pair of record tracks on magnetic tape TP. In like manner, signal $S_3$ is separated into channel signals $S_{31}$ and $S_{32}$ and supplied through time base expansion circuits 6A and 6B and recording amplifiers 8A and 8B to magnetic heads $H_{R1}$ and $H_{R2}$, respectively, which record the expanded signals $S_{31}$ and $S_{32}$ in the next pair of adjacent tracks. In like manner, signal $S_4$ is separated into channel signals $S_{41}$ and $S_{42}$ and supplied through time base expansion circuits 6C and 6D and recording amplifiers 8C and 8D to magnetic heads $H_{R3}$ and $H_{R4}$, respectively, which record the time base expanded signals $S_{41}$ and $S_{42}$ in the next pair of adjacent record tracks on magnetic tape TP. It is to be appreciated, as previously discussed, that adjacent recording rotary magnetic heads $H_{R1}$ and $H_{R2}$ of one pair have magnetic gaps with opposite azimuth angles so that the channel signals, for example, channel signals $S_{11}$ and $S_{12}$, supplied thereto are recorded in adjacent tracks with different azimuth angles, as shown in FIG. 4. In like manner, recording rotary magnetic heads $H_{R3}$ and $H_{R4}$ of the other pair of magnetic heads also have magnetic gaps with opposite azimuth angles. Thus, in accordance with the present invention, because the tape wrapping angle $\theta$ is increased, the recording rotary magnetic heads are in contact with magnetic tape TP for a longer period of time and it therefore becomes necessary to expand the time base of the video signals recorded thereby.

Figure 7:
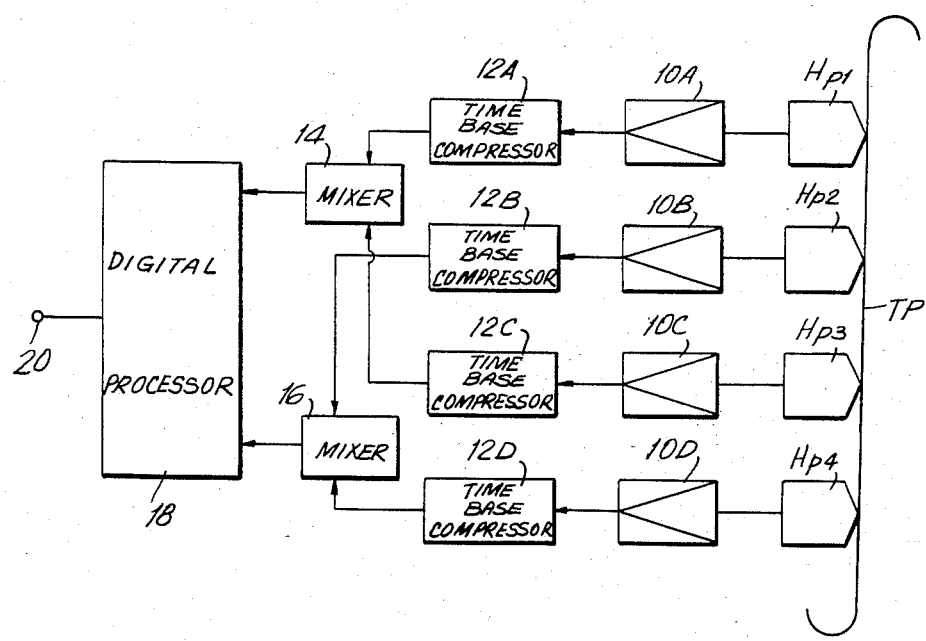
FIG. 7 is a block diagram of a reproducing section of a VTR according to one embodiment of the present invention.
Figure 8:
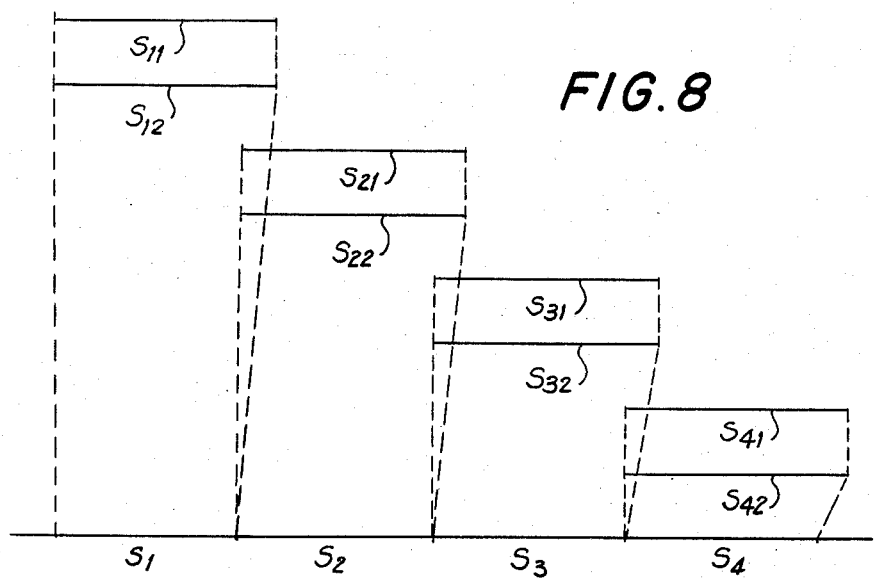
FIG. 8 is a timing chart used for explaining the operation of the reproducing section of FIG. 7.

Referring now to FIG. 7, a reproducing section of a VTR according to the present invention includes reproducing rotary magnetic heads $H_{P1}$-$H_{P4}$ which are arranged in pairs, as previously discussed in regard to FIG. 1. In this manner, the expanded video signals $S_{11}$ and $S_{12}$ are reproduced by magnetic heads $H_{P1}$ and $H_{P2}$, respectively, and supplied through reproducing amplifiers 10A and 10B to time base compression circuits 12A and 12B, respectively. The latter time base compression circuits 12A and 12B time base compress the expanded video signals $S_{11}$ and $S_{12}$, respectively, to return the expanded signals to their original time base, as shown in FIG. 8, and supplies the same through mixing circuits 14 and 16, respectively, to a reproducing digital processing circuit 18 which combines the signals to form digital video signal $S_1$. The latter circuit then returns digitized video signal $S_1$ to analog form and supplies the same to an output terminal 20. Subsequent thereto, when rotary magnetic heads $H_{P3}$ and $H_{P4}$ trace the next pair of adjacent record tracks on magnetic tape TP, expanded video signals $S_{21}$ and $S_{22}$ are supplied through reproducing amplifiers 10C and 10D to time base compression circuits 12C and 12D, respectively, which return the expanded signals to their original time base, as shown in FIG. 8. The output signals from time base compression circuits 12C and 12D are then supplied through mixing circuits 14 and 16, respectively, to reproducing digital processing circuit 18 which combines the signals to form digital video signal $S_2$, converts the same into analog form and supplies analog video signal $S_2$ to output terminal 20. In like manner, reproducing magnetic heads $H_{P1}$ and $H_{P2}$ reproduce expanded video signals $S_{31}$ and $S_{32}$ during the trace of the next two adjacent tracks, and reproducing magnetic heads $H_{P3}$ and $H_{P4}$ and reproduce expanded video signals $S_{41}$ and $S_{42}$ during the trace of the next two adjacent tracks. In this manner, the original continuous analog video signal is supplied to output terminal 20.

It is to be appreciated that various modifications within the scope of the present invention can be made to the above-described embodiment. For example, although the present invention has been preferably described with respect to digital video signals, the present invention may be utilized with audio signals or a combination of video and audio signals, in analog or digital form. In addition, although the recording and reproducing rotary magnetic heads have been provided separately, the same rotary magnetic heads can be used in common for both recording and reproducing. In addition, although only two pair of rotary magnetic heads have been shown for recording and reproducing, two or more pairs of rotary magnetic heads can be used for recording and reproducing with the present invention. For example, if four pair of rotary magnetic heads are used each for recording and reproducing, although the nominal real time wrapping angle $\theta$ is selected as 90°, with the present invention the wrapping angle $\theta$ can be increased to an angle greater than 90°, for example, approximately 120°. In this manner, without increasing the size of the tape guide drum, a high signal-to-noise (S/N) ratio, with a sufficiently wide frequency range is provided.

Having described a specific preferred embodiment of the invention with reference to the accompanying drawings, it is to be understood that the present invention is not limited to that precise embodiment, and that various changes and modifications may be effected therein by one skilled in the art without departing from the scope or spirit of the invention as defined in the appended claims.

What is claimed is:

1. Apparatus for recording two channels of information signals in a plurality of tracks on a flexible medium, comprising:
   drum means engageable with said flexible record medium;
   tape guide means positioned adjacent to said drum means and engageable with said flexible record medium;
   said drum means and said tape guide means cooperating to train said flexible record medium about said drum means through an arc subtending an angle within the range of 180° to 240°;
   time base expansion means for expanding the time base of said information signals to produce time base expanded information signals; and
   two pairs of transducer means for recording said time base expanded information signals in said plurality of tracks on said flexible record medium; wherein:
   the transducer means of each of said pairs are adjacent to each other, said pairs of transducer means are equally spaced from one another by an angle of 180°, one transducer means of each of said pairs records one of said channels and has a magnetic gap which assumes a first azimuth angle with respect to said tracks and the other transducer means of each of said pairs records the other of said channels and has a magnetic gap which assumes a second, different azimuth angle with respect to said tracks; and
   said time base expansion means expands the time base of said information signals so that the Nyquist frequency thereof is multiplied by a factor less than 1.0 but not less than 0.75.

2. Apparatus according to claim 1; in which said first and second azimuth angles are equal and opposite.

3. Apparatus according to claim 1; in which said information signals are analog signals; and further including means for converting said analog signals to digital form prior to recording by said transducer means.

4. Apparatus according to claim 1; wherein said drum means rotates with said transducer means.

5. A method of recording two channels of information signals in a plurality of tracks on a flexible record medium, comprising the steps of:
   training said flexible record medium through an arc subtending an angle within the range of 180° to 240°;
   expanding the time base of said information signals to produce time base expanded information signals whereof the Nyquist frequency is multiplied by a factor less than 1.0 but not less than 0.75;
   recording said time base expanded information signals in said plurality of tracks on said record medium with two pairs of transducer means, wherein the transducer means of each of said pairs are adjacent to each other, said pairs of transducer means are equally spaced from one another by an angle of 180°, and each transducer means includes a magnetic gap;
   orienting one transducer means of each of said pairs so that the magnetic gap thereof assumes a first azimuth angle with respect to said tracks and the other transducer means of each of said pairs so that the magnetic gap thereof assumes a second, different azimuth angle with respect to said tracks; and employing one transducer means of each of said pairs to record one of said channels and the other transducer means of each of said pairs to the record the other of said channels.

6. A method according to claim 5; in which said flexible record medium is a magnetic tape.

7. Apparatus for reproducing two channels of original information signals that have been time base expanded so that the Nyquist frequency thereof is multiplied by a factor less than 1.0 but not less than 0.75 and recorded in a plurality of tracks on a flexible record medium, comprising:

drum means engageable with said flexible record medium;

tape guide means positioned adjacent to said drum means and engageable with said flexible record medium;

said drum means and said tape guide means cooperating to train said flexible record medium about said drum means through an arc subtending an angle within the range of 180° to 240°;

two pairs of transducer means for reproducing said time base expanded information signals from said plurality of tracks on said record medium; and time base compression means for time base compressing said time base expanded information signals to reproduce said original information signals, wherein:

the transducer means of each of said pairs are adjacent to each other, said pairs of transducer means are equally spaced from one another by 180°, one transducer means of each of said pairs reproduces one of said channels and has a magnetic gap which assumes a first azimuth angle with respect to said tracks and the other transducer means of each of said pairs reproduces the other of said channels and has a magnetic gap which assumes a second, different azimuth angle with respect to said tracks.

8. Apparatus according to claim 7; in which said first and second azimuth angles are equal and opposite.

9. Apparatus according to claim 7; in which said time base expanded signals are digital signals; and further including means for converting said digital signals to analog form.

10. Apparatus according to claim 7; wherein said drum means rotates with said transducer means.

11. A method of reproducing two channels of original information signals that have been time base expanded so that the Nyquist frequency thereof is multiplied by a factor less than 1.0 but not less than 0.75 and recorded in a plurality of tracks on a flexible record medium, comprising the steps of:

training said flexible record medium through an arc subtending an angle within the range of 180° to 240°;

reproducing said time base expanded information signals from said plurality of tracks on said flexible record medium with two pairs of reproducing transducer means, wherein the transducer means of each of said pairs are adjacent to each other, said pairs of transducer means are spaced apart from one another by an angle of 180°, and each reproducing transducer means includes a magnetic gap;

orienting one reproducing transducer means of each of said pairs of reproducing transducer means so that the magnetic gap thereof assumes a first azimuth angle with respect to said tracks and the other reproducing transducer means of each of said pairs of reproducing transducer means so that the magnetic gap thereof assumes a second azimuth angle with respect to said tracks;

employing one transducer means of each of said pairs to reproduce one of said channels and the other transducer means of each of said pairs to reproduce the other of said channels; and time base compressing said time base expanded information signals to reproduce said original information signals.

12. A method according to claim 11; in which said flexible record medium is a magnetic tape.

13. Apparatus for recording and reproducing two channels of original information signals in a plurality of tracks on a flexible record medium, comprising:

drum means engageable with said flexible record medium;

tape guide means positioned adjacent to said drum means and engageable with said flexible record medium;

said drum means and said tape guide means cooperating to train said flexible record medium about said drum means through an arc subtending an angle within the range of 180° to 240°;

a recording section having time base expansion means for expanding the time base of the information signals to produce time base expanded information signals whereof the Nyquist frequency is multiplied by a factor less than 1.0 but not less than 0.75, and two pairs of transducer means for recording the expanded information signals in the plurality of tracks on the record medium, wherein the recording transducer means of each of said pairs of recording transducer means are adjacent to each other, said pairs of recording transducer means are equally spaced from one another by an angle of 180°, one recording transducer means of each of said pairs of recording transducer means records one of said channels and has a magnetic gap which assumes a first azimuth angle with respect to said tracks and the other recording transducer means of each of said pairs of recording transducer means records the other of said channels and has a magnetic gap which assumes a second, different azimuth angle with respect to said tracks; and a reproducing section having two pairs of reproducing transducer means for reproducing the time base expanded information signals from the record medium, wherein the reproducing transducer means of each of said pairs of reproducing transducer means are adjacent to each other, said pairs of reproducing transducer means are equally spaced from one another by an angle of 180°, one reproducing transducer means of each of said pairs of reproducing transducer means reproduces one of said channels and has a magnetic gap which assumes said first azimuth angle with respect to said tracks and the other reproducing transducer means of each of said pairs of reproducing transducer means reproduces the other of said channels and has a magnetic gap which assumes said second azimuth angle with respect to said tracks; and time base compression means for time base compressing the time base of the reproduced time base expanded information signals to reproduce the original information signals.

14. A method of recording and reproducing two channels of original information signals in a plurality of tracks on a flexible record medium, comprising training said flexible record medium through an arc subtending an angle within the range of 180° to 240° and comprising the recording steps of:
   expanding the time base of the information signals by a factor equal to the ratio of said angle to 180° to produce time base expanded information signals;
   recording the time base expanded information signals in the plurality of tracks on the record medium with two pairs of recording transducer means, wherein the transducer means of each of said pairs of recording transducer means are adjacent to each other, said pairs of recording transducer means are equally spaced apart from one another by an angle of 180°, and each recording transducer means includes a magnetic gap; and
   orienting one transducer means of each of said pairs of recording transducer means so that the magnetic gap thereof assumes a first azimuth angle with respect to said tracks and the other transducer means of each of said pairs of recording transducer means so that the magnetic gap thereof assumes a second, different azimuth angle with respect to said tracks; and
   employing one transducer means of each of said pairs of recording transducer means to record one of said channels and the other transducer means of each of said pairs of recording transducer means to record the other of said channels; and
comprising the reproducing steps of:
   reproducing the time base expanded information signals from the record medium with two pairs of reproducing transducer means, wherein the transducer means of each of said pairs of reproducing transducer means are adjacent to each other, said pairs of reproducing transducer means are equally spaced apart from one another by an angle of 180°, and each reproducing transducer means includes a magnetic gap;
   orienting one transducer means of each of said pairs of reproducing transducer means so that the magnetic gap thereof assumes said first azimuth angle with respect to said tracks and the other transducer means of each of said pairs of reproducing transducer means so that the magnetic gap thereof assumes said second azimuth angle with respect to said tracks; and
   employing one transducer means of each of said pairs of reproducing transducer means to reproduce one of said channels and the other transducer means of each of said pairs of reproducing transducer means to reproduce the other of said channels; and
   time base compressing the time base of the time base expanded information signals to reproduce the original information signals.

* * * * *